United States Patent [19]

Green

[11] Patent Number: 4,795,006

[45] Date of Patent: Jan. 3, 1989

[54] HYDRAULICALLY-OPERATED ACTUATOR ASSEMBLIES FOR VEHICLE BRAKES

[75] Inventor: Andrew P. Green, Gwent, Wales

[73] Assignee: Lucas Industries, Ltd., Birmingham, England

[21] Appl. No.: 118,748

[22] Filed: Nov. 6, 1987

[30] Foreign Application Priority Data

Nov. 5, 1986 [GB] United Kingdom ............... 8626483
Nov. 29, 1986 [GB] United Kingdom ............... 8628592

[51] Int. Cl.⁴ .................................................. F16D 65/54
[52] U.S. Cl. ................................. 188/196 P; 188/79.62
[58] Field of Search .................. 188/79.5 R, 79.5 GE, 188/79.55, 196 P, 199, 79.62

[56] References Cited

U.S. PATENT DOCUMENTS 2,747,694  5/1956  Helvern ................ 188/79.5 GE
3,467,226  9/1969  Belart .................. 188/79.5 GE
3,482,664  12/1969 Bachmann ............ 188/79.5 GE

*Primary Examiner*—Duane A. Reger
*Attorney, Agent, or Firm*—Oldham & Oldham Co.

[57] ABSTRACT

An actuator assembly includes first and second components which are movable away from each other to initiate application of a brake, upon pressurization of a pressure space between the components. An automatic adjuster assembly co-operating with the components comprises an axially extending member including a piston portion working in a bore in the first component of which the end of the bore remote from the pressure space is vented to atmosphere, a friction ring co-operating with the member and coupled to the component for relative movement through a distance corresponding to desired braking clearances, a spring for biassing the member away from the first component to maintain it in engagement with the other component when the pressure space is pressurized and until the pressure acting on the member overcomes the force in the spring whereafter the member moves in the opposite direction until that movement is arrested by the co-operation of the ring with the component upon release of the brake, the spacing between the components is determined by the co-operation between the component and the member.

16 Claims, 3 Drawing Sheets

HYDRAULICALLY-OPERATED ACTUATOR ASSEMBLIES FOR VEHICLE BRAKES

This invention relates to hydraulically-operated actuator assemblies for vehicle brakes of the kind comprising a piston and cylinder assembly which includes a pair of components which are movable relatively away from each other to initiate application of the brake upon pressurisation of a pressure space between the components, and an automatic adjuster assembly co-operates with the two components to determine the relative retracted positions of the components, whereby to establish and maintain braking clearances within predetermined limits.

In hydraulically-operated actuator assemblies of the kind set forth it is a problem to arrange that such adjuster assemblies, in use, do not respond to deflections of parts of the brake when the brake is applied, otherwise there may be a tendency for the adjuster assemblies to "over adjust" and excessive braking clearances may have to be provided to compensate for such "over adjustment".

In GB-B-2 148 425 we have disclosed an hydraulic actuator comprising a pair of oppositely acting hydraulic pistons working in a bore and incorporating an automatic slack adjuster assembly which is housed in aligned bores in the pistons and acts as a strut to determine the relative retracted positions of the pistons. The adjuster assembly comprises a clamp member movable with one of the pistons and an adjuster member, the members including interengaging parts which co-operate with each other to form a releasable detent, in combination with a spring ring for biassing the interengaging parts into engagement. The piston and the clamp member are provided with interengaging inclined faces to provide a wedge action and enhance the engagement of the interengaging parts when the bore is pressurised, and a stop loaded by a spring is provided in the bore with which the adjuster member is adapted to co-operate when movement of that member in a brake-applying direction exceeds a distance sufficient to take up the braking clearances. Additional movement of the clamp member in the same direction is operative to increase the effective length of the strut with the detent released until the force of the engagement of the interengaging parts at a predetermined point exceeds the force of the spring. The detent is re-engaged to prevent further relative axial movement between the two members whereafter, further movement of the strut with the piston is accommodated by movement of the stop against the loading in the spring. The adjusted retracted position defines a position to which the piston can retract when the brake pressure is relieved and which determines the braking clearances, no relative movement between the clamp member and the adjuster member taking place when the brake pressure is so relieved.

In GB-B-2 148 425 the said predetermined point is chosen as the point at which the brake is fully applied and beyond which the parts of the brake begin to deflect. In such a case the adjuster assembly is said to be load-insensitive since it will adjust only as a result of excessive piston movement due to wear of brake linings and not in response to excessive piston movement due to deflection of the parts of the brake after the brake had been fully applied.

The adjuster assembly incorporated in the actuator assembly of GB-B-2 148 425 is relatively complex in construction.

According to our invention in an hydraulically-operated actuator assembly of the kind set forth the automatic adjuster assembly comprises an axially extending member co-operating with the two components and including an end portion which is received in a bore in one of the components, means for preventing relative axial movement between the axially extending member and the other component at least until the braking clearances have been taken up, a ring co-operating with the member and also coupled to the said one component for relative movement through a limited distance corresponding to the braking clearances and determined by movement between first and second stops, relative movement between the components through a distance greater than the said limited distance causing the ring to slide on the member, whereafter, upon release of the brake, the ring co-operates with the said one component to determine an adjusted release position for the components.

Preferably the end portion comprises a piston which works in the bore in the said one component, and the end of the bore remote from the pressure space is vented to atmosphere, a spring being provided for biassing the axially extending member relatively away from the said one component to maintain the member in engagement with the other component when the pressure space is pressurized and until the pressure in the pressure space which acts on the end of the member remote from the piston portion is sufficient to overcome the force in the spring whereafter the member moves in the opposite direction away from the second stop until that movement is arrested by the co-operation of the ring with the said one component, upon release of the brake the spacing between the components defining the adjusted position is determined by the co-operation between the said other component and the member.

The point at which the member moves in the said opposite direction is chosen as the point at which fluid pressure in the pressure space will rise rapidly as soon as the braking clearances have been taken up. Thus any relative movement between the components after this point has been attained, for example due to deflection of parts of the brake, will have no effect on the adjuster assembly and the desired braking clearances. Our adjuster is therefore load-insensitive.

The spring may act between the piston portion and the base of the bore in which it works. In a modification in which the member extends into a clearance bore in the said other component, the spring may be housed in the clearance bore and act between complementary abutments on the member and on the component.

In another construction the axially extending member is fast with the other component, and the second stop is perforated.

This enables the system to be bled fully since air can escape past the second stop through the perforations, even though the ring may be in co-operation with it.

Preferably the second stop comprises a sprag washer through which the member extends and which has a spragging engagement with the wall of a counterbored recess in the one component, the sprag washer being movable in the counterbore only in an inward direction.

This facilitates assembly since relative movement between the two components when the actuator assembly is assembled acts to urge the spring washer into the counterbored recess and into its operative position to define the second stop as the two components move into co-operation.

In the construction described above the ring may comprise a resilient friction ring which is urged into a wedging engagement with the member to define the adjusted release position.

When the piston and cylinder assembly comprises first and second opposed pistons working in a common bore in a cylinder, the member projects from one piston into a bore in the other piston, and the ring is retained in a counterbored recess in the said one piston, the braking clearances being defined by movement of the ring in the recess through a distance defined by the spacing between the first and second stops.

Conveniently the first stop comprises a face at the base of the recess.

Preferably the recess has a wall including a portion of frusto-conical outline, and the first stop comprises a part of the portion of frusto-conical outline which applies a wedge action to the ring, in turn to clamp it against the rod, the second stop comprising a circlip through which the member extends into the said other piston.

Although our actuator assembly may be used to operate any suitable vehicle brake, either disc or drum, it is particularly convenient to utilize it for initiating operation of any known self-energizing disc brake of the spreading type, in which the assembly is installed within a housing of the brake and the components act between radial lugs on a pair of pressure plates, the relative anuglar movement between which is accompanied by a relative axial movement to urge rotatable friction discs into engagement with spaced opposed braking surfaces in the housing.

Some embodiments of our invention are illustrated in the accompanying drawings in which.

Figure 1:
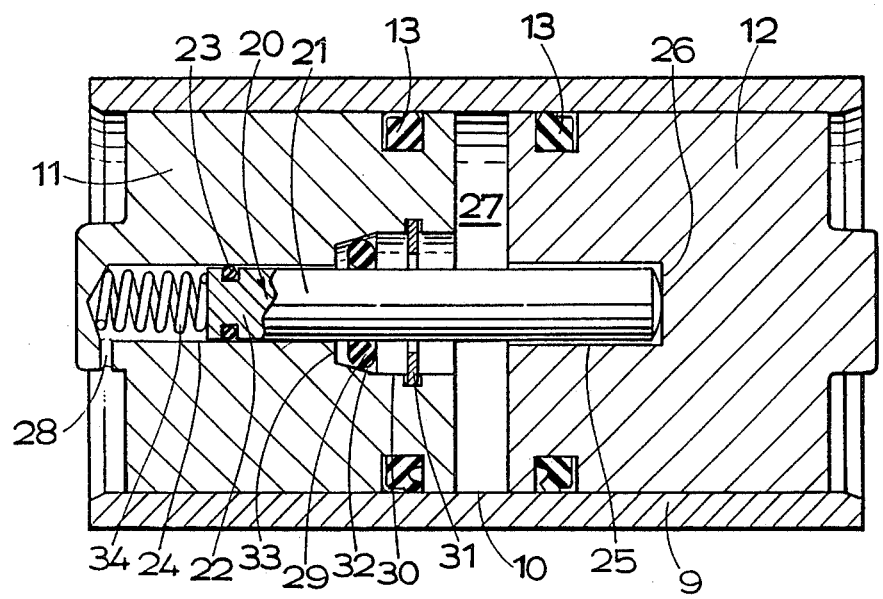
FIG. 1 is a longitudinal section through an hydraulic actuator assembly for a vehicle brake of the spreading type.

The hydraulic actuator assembly illustrated in FIG. 1 of the accompanying drawings is adapted to initiate application of any known brake of the self-energising spreading type.

The hydraulic actuator assembly comprises a cylinder 9 which is carried from the housing of the brake and has a longitudinally extending open-ended bore 10 in which work a pair of opposed pistons 11, 12 each provided with a seal 13 adjacent to its inner end. The axis of the cylinder 9 is tangential to the pressure plates of the brake and lies in a plane which is angled with respect to a transverse plane parallel to the plane of each plate.

An automatic slack adjuster assembly 20 is incorporated in the actuator.

As illustrated the adjuster assembly comprises a member 21 in the form of a rod which co-operates with both pistons 11, 12. One end of the rod 21 comprises a piston portion 22 which carries a seal 23 and works in a longitudinally extending bore 24 in the piston 11, and the other end of the rod 21 extends into a clearance bore 25 in the piston 12 and normally engages with a face 26 at the inner end of the bore. The end of the bore 24 remote from a pressure space 27 defined in the bore 10 between the pistons 11, 12 is vented to atmosphere through a radial port 28.

A resilient friction snap ring 29 is retained in a counterbored recess 30 at the inner end of the bore 24 by means of a circlip 31. The rod 21 is slidable through the ring 29. The wall of the recess 30 includes a frusto-conical portion 32 of which the end of smaller diameter terminates at the base 33 of the recess. The external diameter of the ring 29 is greater than the end of the frusto-conical portion 32 which is of smaller diameter, but is smaller than the end of greater diameter. The ring has a limited axial movement in the recess 30 between a point on the portion 32, which defines a first stop, and the circlip 31, which defines a second stop.

In the retracted position shown in the drawing the spacing between the pistons 11 and 12 is defined by the engagement between the ring 29 and the frusto-conical portion 32 at the point defining the first stop and by means of which the ring 29 is clamped against the rod 21 by the wedging action of the portion 32. This prevents movement of the rod 21 through the ring 29 in a direction away from the pressure space 27.

A compression spring 34 is housed in the outer end of the bore 24 and acts on the piston portion 22, normally to maintain the rod 21 in contact with the face 26 at the base of the bore 25.

When the brake is to be applied hydraulically, hydraulic fluid admitted to the pressure space 27 urges the pistons 11, 12 relatively away from each other, in turn to move the pressure plates angularly in opposite directions to initiate application of the brake in a known manner until the braking clearances are taken up. During this operation, the spring 34 acts to urge the piston portion 22 axially in order to maintain the rod 21 in contact with the face 26, and the ring 29 is carried with the rod 21, relatively away from the frusto-conical portion 32.

When no adjustment is required, the relative movement between the pistons 11 and 12 with the rod 21 accompanying the piston 12 will only be sufficient to cause the ring 29 to engage with the circlip 31 at the point that the braking clearances are taken up.

If, however, adjustment is required, then movement of the ring 29 with the rod 21 in the brake-applying direction will be arrested by the circlip 31, and the rod 21 will be withdrawn through the ring 29 until the braking clearances have been taken up.

As soon as the braking clearances have been taken up, the fluid pressure in the pressure space 27 will rise rapidly, acting on the end of the rod 21. Since the opposite end of the rod 21 is exposed to atmosphere, the rod 21 will move back against the force in the spring 34 and carry the ring 29 back with it until movement of the ring 29, and the rod with it, are both arrested by the engagement of the ring 29 with the frusto-conical portion 32. The wedge angle between the portion 32 and the rod 21 is so chosen that the rod 21 will be firmly held in that position by the action of friction.

When the pressure in the pressure space 27 is released, the pistons 11 and 12 are moved towards each other and are held in a spaced apart position determined by the effective length of the rod 21 namely the distance by which it projects from the ring 29. This distance remains constant in a brake-applying sequence in which no adjustment has occurred, but increases to compensate for wear of the friction lining when the rod 21 has slid through the ring 29 as described above.

To facilitate installation of the actuator assembly in the brake, it is desirable to maintain the effective length of the assembly at a minimum by holding the rod 21 in a retracted position, and with the spring 34 prevented from acting on it to urge the pistons 11 and 12 away from each other.

Figure 2:
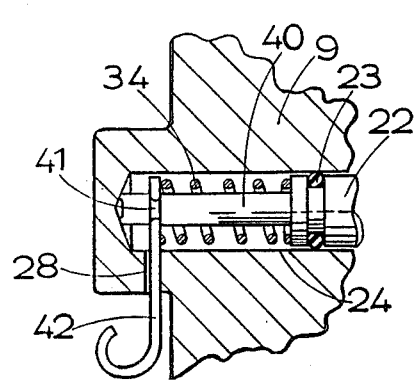
FIG. 2 is a longitudinal section through a part of the hydraulic actuator of FIG. 1 but showing a modification.

This can be achieved, as shown in FIG. 2, by providing the rod 21 with an axial extension 40 which the spring 34 surrounds, and inserting a wire 42 through the radial port 28 to co-operate at its inner end in a groove 41 in the extension 40. The wire acts to hold the rod 22 in a retracted position and as an abutment for the outer end of the spring 34.

After installation in the brake, the wire 42 is withdrawn from the port 28 to release the spring 34 and the rod 40.

Figure 3:
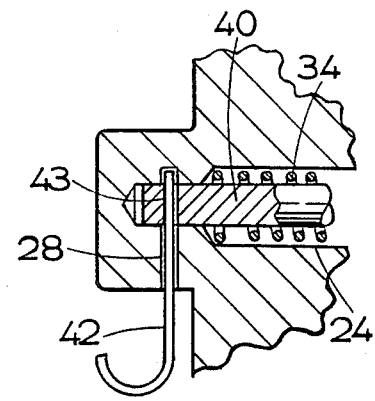
FIG. 3 is a longitudinal section through a part of the hydraulic actuator of FIG. 1 but showing another modification.

In the modified construction illustrated in FIG. 3, the port 28 traverse the bore 24 and the wire 42 is passed through a cross-drilling 43 in the rod 40.

Figure 4:
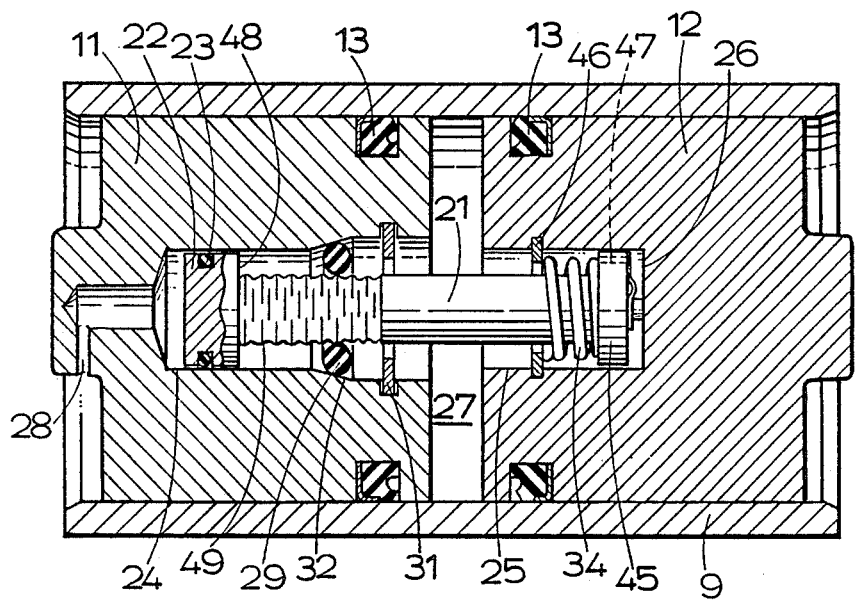
FIG. 4 is a longitudinal section through another hydraulic actuator assembly.

In the actuator assembly illustrated in FIG. 4, the spring 34 comprises a compression spring which acts between a head 45 at the end of the rod 21 remote from the piston portion 22 and a circlip 46 in the wall of the bore 25. The head 45 incorporates a damper or flow control valve 47 to ensure that adjustment does not occur when the brake is released, thereby prevented any tendency for over adjustment to occur due to a sudden pressure drop as a result of the pedal being released quickly.

The rod 21 is also provided with a grooved working surface 49 to enhance the grip between the ring 29 and the rod 21.

The rod is of smaller diameter than that of the piston portion 22 and the forward face 48 of the piston portion 22 defines a wear stop which is engageable with the ring 29 at a predetermined point in order to limit the spacing between the pistons 11 and 12, thereby preventing further adjustment beyond this point.

The construction and operation of the assembly of FIG. 4 are otherwise the same as that of FIG. 1, and corresponding reference numerals have been applied to corresponding parts.

Figure 5:
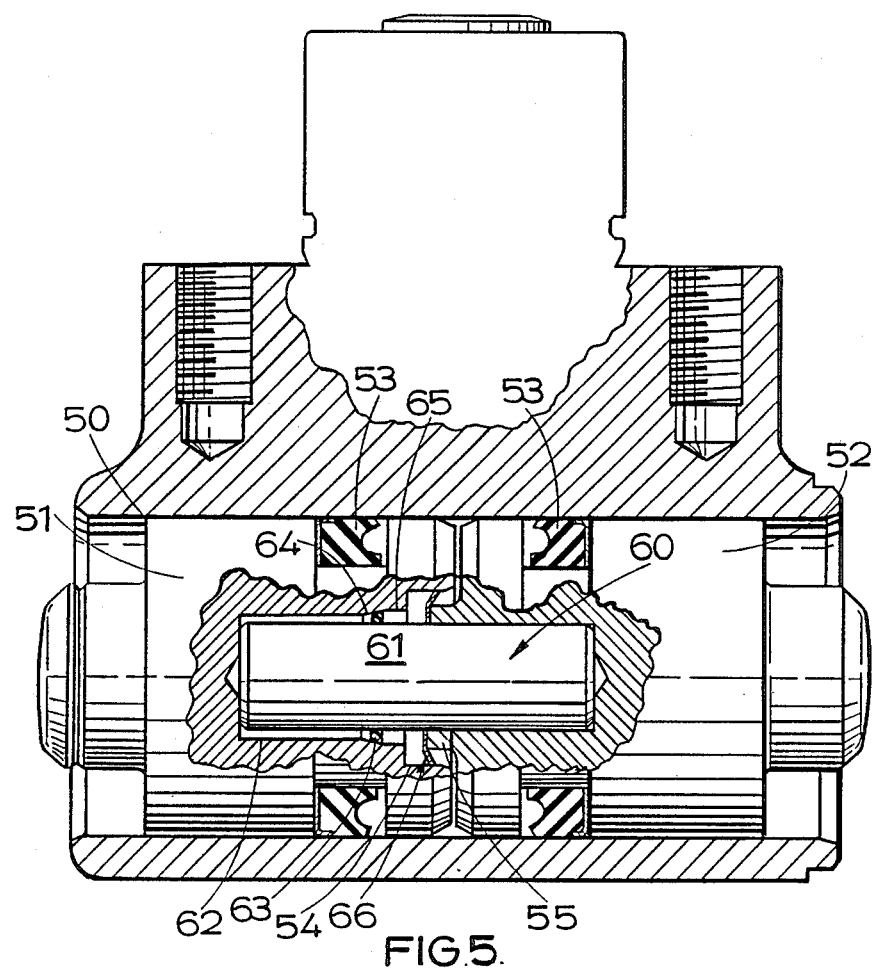
FIG. 5 is a longitudinal section through an hydraulic actuator assembly for a vehicle brake of the spreading type.
Figure 6:
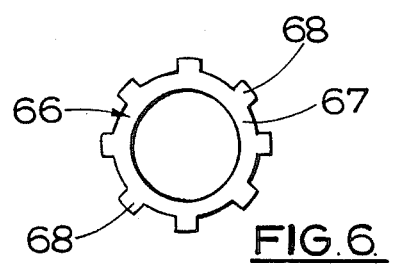
FIG. 6 is a plan of the spragging washer incorporated in the actuator of FIG. 5.

The hydraulic actuator illustrated in FIGS. 5 and 6 of the drawings comprises a cylinder body which is carried from a housing of a brake and has a longitudinally extending open-ended bore 50 in which work a pair of opposed pistons 51, 52 each provided with a seal 53 adjacent to its inner end. The piston 51 has a couterbored recess 54 in its inner end into which a spigot 55 on the adjacent end of the piston 52 projects with substantial clearance when the two pistons are in engagement.

An automatic slack adjuster 60 is incorporated in the actuator. As illustrated the adjuster 60 comprises a member 61 in the form of a rod which projects axially from the inner end of the piston 52 into a complementary blind bore 62 extending from the inner end of the recess 54. The rod 61 is retained in the piston 52 against relative axial movement. The rod 61 is slidable through a resilient friction snap ring or circlip 63 which is adapted to co-operate with a frusto-conical face 64 between the bore 62 and a counterbored 65.

A spragging washer 66 surrounding the rod 61 and through which the rod 61 is freely movable, has an internal annular portion 67 with which the spigot 55 is engageable, and a series of angularly spaced teeth 68 projecting radially from the outer peripheral edge of the portion 67 are inclined relatively towards the piston 52. This enables the washer 66 to slide into the counterbored recess 54, but the teeth 68 engage with the wall of the recess 54 to prevent movement of the washer 66 in the opposite direction with respect to the piston 51.

The friction ring 63 has a limited movement with the rod 61 between the face 64, which defines a first stop, and the washer 66, which defines a second stop, through a distance equivalent to brake clearances.

The external diameter of the ring 63 is greater than the end of the frusto-conical portion 64 which is of smaller diameter but is smaller than the end of greater diameter. In a retracted position the spacing between the pistons 51, and 52 is defined by an engagement between the ring 63 and the fruto-conical portion 64, at a point which defines the first stop and by means of which the ring 63 is clamped against the rod 61 by the wedging action of the portion 64. This prevents movement of the rod 61 through the ring 63 in a direction towards the piston 51.

When fluid is admitted to the cylinder bore 50 and pistons 51 and 52 move away from each other, the rod 61 which is retained firmly in the piston 52, moves with the piston 52 carrying the ring 63 with it and relatively away from the piston 51.

Normally, when no adjustment is required, the relative movement between the pistons 51 and 52 will only be sufficient to cause the ring 63 to engage with the spragging washer 66 when the brake is applied fully. However, should adjustment in fact be required, additional relative movement between the pistons 51,52 will cause the rod 61 to be withdrawn through the ring 63, after movement of the ring 63 with the rod 61 in that direction has been arrested by the washer 66.

When the brake is released, the pistons 51 and 52 retract but are held in an adjusted, spaced apart, position by the further engagement of the ring 63 with the frusto-conical portion 64 to clamp the ring 63 against the rod 61 with the wedging action as described above.

To assemble the actuator assembly the rod 61 is first made fast in the piston 52. The spragging washer 66 and the ring 63 are both slid onto the rod 61 in close proximity to the spigot 55. The piston 51, and the piston 52 are then slid into the bore 50 until they abut at adjacent ends. This urges the washer 66 into the recess 54 as described above to determine the second stop. The ring 63 is spaced from the face 64.

When the fluid is first admitted to the cylinder bore 50 and the pistons 51 and 52 move apart, movement of the ring 63 with the rod 61 is arrested by the washer 66 as described above to determine the brake clearances upon release of pressure from the bore 50.

When the system is bled, any air trapped between the rod 61 and the bore 62 can escape through gaps between the teeth 68, even though the ring 63 may be in engagement with the washer 66, since these gaps are disposed radially outwards of the ring 63.

I claim:

1. An hydraulically-operated actuator assembly for a vehicle brake comprising a piston and cylinder assembly which includes a pair of first and second components, means defining a pressure space between said components, said components being movable relatively away from each other to initiate application of the brake upon pressurisation of said pressure space, and an automatic adjuster assembly adapted to co-operate with said components to determine the relative retracted positions of said components, whereby to establish and maintain braking clearances within predetermined limits, wherein said automatic adjuster assembly comprises an axially extending member co-operating with said first and second components and including an end portion, one of said components having a bore in which said end portion is received, means for preventing relative axial movement between said axially extending member and the other of said components at least until said braking clearances have been taken up, axially spaced first and second stops provided on said one component, a ring co-operating with said member and also coupled to the said one component for relative movement through a limited distance corresponding to said braking clearances and determined by movement between said first and second stops, and biasing means urging said member away from said one component, upon release of the brake said ring co-operating with the said one component to determine an adjusted release position for said components, relative movement between said components through a distance greater than the said limited distance when said pressure space is pressurized to a pressure less than a predetermined pressure causing said ring to slide on said member due to the engagement of said ring with one of said stops, and relative movement between said components through a distance greater than the said limited distance when said pressure space is pressurised to a pressure above said pre-determined pressure causing said member to move relative to said one component, against the action of said biasing means, wherein said release position of said components is only adjusted when said pressure space is pressurised at a pressure less than said predetermined pressure.

2. An hydraulically-operated actuator assembly for a vehicle brake comprising a piston and cylinder assembly which includes a pair of first and second components, means defining a pressure space between said components, said components being movable relatively away from each other to initiate application of the brake upon pressurisation of said pressure space, and an automatic adjuster assembly adapted to co-operate with said components to determine the relative retracted positions of said components, whereby to establish and maintain braking clearances within predetermined limits, wherein one of said components has a bore, and said automatic adjuster assembly comprises an axially extending member co-operating with said first and second components and including at one end a piston portion which works in said bore in said one of said components of which an end of said bore remote from said pressure space is vented to atmosphere, a ring co-operating with said member and also coupled to the said one component for relative movement through a limited distance corresponding to braking clearances, relative movement between said components through a distance greater than the said limited distance when said pressure space is pressurised and while the pressure in said pressure space is less than a predetermined pressure causing said ring to slide on said member, and a spring for biassing said axially extending member relatively away from the said one component to maintain said member in engagement with the other of said components when said pressure space is pressurised and while the pressure in said pressure space is less than said predetermined pressure, said predetermined pressure being that pressure at which pressure in the pressure space acting on the end of said member remote from said piston portion is sufficient to overcome the force in said spring whereafter to move said member rearwards out of engagement with said other component and towards said one component, said rearward movement of said member relative to said one component being limited by the co-operation of said ring with the said one component, adjustment of the position of said ring on said member being possible when said pressure space is pressurised to a pressure less than said predetermined level but not being possible when the pressure space is pressurised to a higher pressure, upon release of the brake the spacing between said components defining an adjusted release position which is determined by co-operation between the said other components and said chamber.

3. An actuator according to claim 2, wherein said spring acts between said piston portion and the base of said bore in which it works.

4. An actuator assembly according to claim 2, wherein said member extends into a clearance bore in the said other component, and said spring is housed in said clearance bore and acts between complementary abutments on said member and on said component.

5. An actuator assembly according to claim 2, wherein said ring comprises a resilient friction ring which is adaptd to be urged into a wedging engagement with said member to define the adjusted release position.

6. An actuator assembly according to claim 1, wherein said piston and cylinder assembly comprises a cylinder having a bore, and first and second opposed pistons working in said bore in said cylinder, said member projecting from one piston into a bore in the other piston, and said ring is retained in a counterbored recess in the said one piston, the braking clearances being defined by movement of said ring in said recess through a distance defined by the spacing between said first and second stops.

7. An actuator assembly according to claim 6, wherein said first stop comprises a face at the base of said recess.

8. An actuator assembly according to claim 7, wherein said recess has a wall including a portion of frusto-conical outline, and said first stop comprises a part of the portion of frusto-conical outline which applies a wedge action to the ring, in turn to clamp it against the rod, said second stop comprising a circlip through which the member extends into the said other piston.

9. An hydraulically-operated actuator assembly for a vehicle brake comprising a piston and cylinder assembly which includes a pair of first and second components, means defining a pressure space between said components, said components being movable relatively away from each other to initiate application of the brake upon pressurisation of said pressure space, and an automatic adjuster assembly adapted to co-operate with said components to determine the relative retracted positions of said components, whereby to establish and maintain braking clearances within predetermined limited, wherein said automatic adjuster comprises an axially extending member fast with one of said components, first and second stops, and a ring co-operating with said member and also coupled to the other of said two components for relative movement through a limited distance corresponding to braking clearances and determined by movement beween said first and second stops, relative movement between said components through a distance greater than said limited distance causing said ring to slide on said member, whereafter, on release of the brake, said ring co-operates with the said other component to determine an adjusted release position for the components, and wherein said first stop is provided on said one component and said adjuster assembly is adapted to be initially assembled together by assembling said ring and said second stop to said other component and then bringing the components together in operative relationship whereupon said second stop is automatically secured to said one component with said ring located between said stops.

10. An actuator assembly according to claim 9 wherein said axially extending member is fast with the said other component.

11. An actuator assembly according to claim 10, wherein said second stop comprises a sprag washer through which said member extends and which has a spragging engagement with the wall of a counterbored recess in the said one component when said components are initially brought together in operative relationship, said sprag washer being movable in said counterbore only in an inward direction.

12. An actuator assembly according to claim 9, wherein said ring comprises a resilient friction ring which is urged into a wedging engagement with said member to define said adjusted release position.

13. An actuator assembly according to claim 9, wherein said piston and cylinder assembly comprises a cylinder having a bore, first and second opposed pistons working in said bore in said cylinder, said member projecting from one piston into a bore in the other piston, and said ring is retained in a counterbored recess in the said one piston, the braking clearances being defined by movement of said ring in said recess through a distance defined by the spacing between said first and second stops.

14. An actuator assembly according to claim 13, wherein said first stop comprises a face at the base of said recess.

15. An actuator assembly according to claim 13, wherein said one piston has a spigot which projects into said recess in said other piston, said spigot engaging said second stop and urging said second stop towards said recess when said actuator assembly is initially assembled.

16. An actuator assembly according to claim 1, wherein said biasing means comprises a spring, said one component has a port opening to atmosphere from said bore, and releasable hold-back means is provided extending initially when said actuator assembly is assembled to a brake from the exterior of said one component through said port and engaging retention means provided in said bore, said hold-back means and said detention means combining to form a detent during said initial assembly of said adjuster assembly to a brake to hold and spring captive so that said spring does not transmit force to said other component during said initial assembly of said adjuster assembly to a brake, withdrawal of said hold-back means form said port releasing said spring.

* * * * *

UNITED STATES PATENT AND TRADEMARK OFFICE
CERTIFICATE OF CORRECTION

PATENT NO. : 4,795,006
DATED : 1-3-89
INVENTOR(S) : Andrew P. Green

It is certified that error appears in the above—identified patent and that said Letters Patent is hereby corrected as shown below:

First Page, Left Column, Item 73 should read

[73] Assignee: Lucas Industries public limited company

Signed and Sealed this

Twenty-fifth Day of July, 1989

*Attest:*

DONALD J. QUIGG

*Attesting Officer*   *Commissioner of Patents and Trademarks*